United States Patent
Takagi et al.

(10) Patent No.: US 6,690,950 B2
(45) Date of Patent: Feb. 10, 2004

(54) DATA RECORDING SYSTEM FOR STORING AS DATA THE CONTENTS OF TELEPHONE CALLS MADE BY INTERNAL TELEPHONES AND BY MOBILE TELEPHONES HAVING MEMORY CARD DATA STORAGE FUNCTION

(75) Inventors: Kenji Takagi, Yokohama (JP); Hiroshi Uranaka, Tokyo (JP)

(73) Assignee: Matsushita Electric Industrial Co., Ltd. (JP)

( * ) Notice: Subject to any disclaimer, the term of this patent is extended or adjusted under 35 U.S.C. 154(b) by 358 days.

(21) Appl. No.: 09/917,929

(22) Filed: Jul. 31, 2001

(65) Prior Publication Data

US 2002/0022473 A1 Feb. 21, 2002

(30) Foreign Application Priority Data

Jul. 31, 2000 (JP) .......................... 2001-231546
Jun. 19, 2001 (JP) .......................... 2001-185208

(51) Int. Cl.[7] ............................. H04M 1/00; H04M 1/64
(52) U.S. Cl. .................. 455/558; 455/412.1; 455/517; 455/550.1; 379/85
(58) Field of Search .................. 455/412.1, 414.1, 455/517, 550.1, 566, 557, 558; 379/68, 69, 70, 85, 84, 88.11, 88.17, 88.22, 88.23, 88.25, 88.26, 265.06, 265.07; 707/1, 10; 709/217, 218, 219

(56) References Cited

U.S. PATENT DOCUMENTS 5,761,624 A * 6/1998 Mooney et al. ............. 455/558
6,470,082 B1 * 10/2002 Nunokawa et al. ......... 455/410
2002/0022473 A1 * 2/2002 Takagi et al. ............... 455/557

FOREIGN PATENT DOCUMENTS

| JP | 6-236316 | | 8/1994 | ......... G06F/15/403 |
| JP | 11-74791 | * | 3/1999 | ............ H04M/3/42 |
| JP | 11-74962 | | 3/1999 | .......... H04M/1/274 |
| JP | 11-136360 | * | 5/1999 | ............ H04M/3/42 |
| JP | 11-355444 | * | 12/1999 | ............ H04M/3/42 |
| JP | 2000-32169 | | 1/2000 | .......... H04M/11/10 |
| JP | 2001-127878 | * | 5/2001 | ............ H04M/3/42 |
| JP | 2002-044260 | * | 2/2002 | ............ H04M/3/42 |

* cited by examiner

Primary Examiner—Marsha D. Banks-Harold
Assistant Examiner—Rafael Perez-Gutierrez
(74) Attorney, Agent, or Firm—Connolly Bove Lodge & Hutz LLP

(57) ABSTRACT

A data recording system for storing the voice data or other data contents of telephone calls, whereby contents of telephone calls performed using internal telephones which are connected via a switchboard to a public telephone network can be stored as data records by a telephone conversation recording apparatus, while contents of telephone calls performed using a mobile telephone can be stored on a memory card as a data record, which can be transmitted from a computer via a computer network and gateway to be stored by the telephone conversation recording apparatus in an identical way to the contents of a call performed using an internal telephone. A user can thus utilize or process the contents of a recorded telephone call in the same way, irrespective of whether the user has performed the telephone call at a remote location using a mobile telephone or by using an internal telephone.

17 Claims, 10 Drawing Sheets

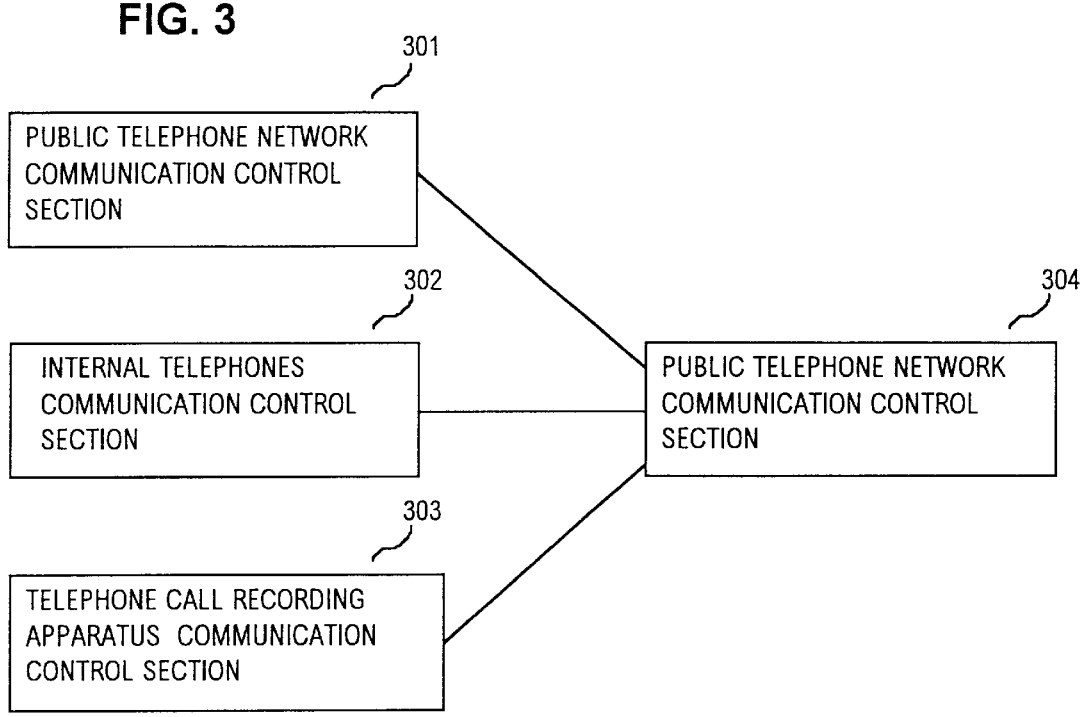
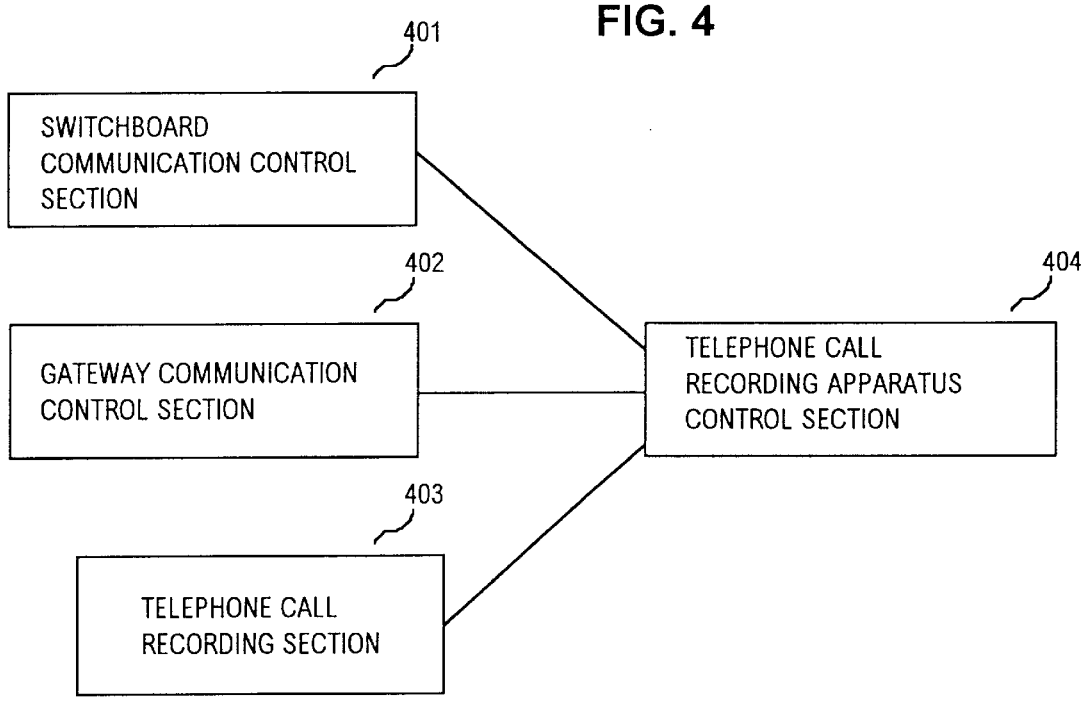

DATA RECORDING SYSTEM FOR STORING AS DATA THE CONTENTS OF TELEPHONE CALLS MADE BY INTERNAL TELEPHONES AND BY MOBILE TELEPHONES HAVING MEMORY CARD DATA STORAGE FUNCTION

BACKGROUND OF THE INVENTION

1. Field of Technology

The present invention relates to a data recording system for recording data transmitted via telephones, such as voice data, video data, etc. In particular the invention relates to a data recording system whereby the contents of telephone communications performed using a mobile telephone and a public telephone network can be acquired by a telephone call recording apparatus and then stored in a similar format to that applied to telephone calls performed using internal telephones which connect via a switchboard to the public telephone network.

2. Description of Prior Art

In recent years, types of telephone voice recording system have been developed which apply VOIP (Voice Over IP) technology to transfer voice data over a computer network such as the Internet, and whereby the contents of a telephone call can be stored as data in a device such as a personal computer. These are typically telephone calls which are made using internal telephones of a company or institution, whose calls are switched via a local telephone switchboard of that company or institution to a public telephone network.

Furthermore, with the present-day rapid popularization of use of mobile telephones, business information interchange by using mobile telephones has started to be performed by individuals from locations which are distant from the offices or company premises of these individuals.

Moreover, with the popularization of mobile telephones, methods are being realized whereby data such as telephone numbers and other information which are held stored in a mobile telephone can be edited by using an appropriate user interface such as a personal computer. On the other hand, with the rapid increase in use of the Internet, standardized types of memory card interface have been developed for personal computers, and this has resulted in a lowering of the prices of memory cards.

In view of the above, there have been proposals to provide an interface for mounting a memory card in a mobile telephone, to thereby enable the data stored in a memory card to be used by both a personal computer and a mobile telephone. For example with Japanese patent HEI 11-74962, instead of being limited to the small amount of internal memory of a mobile telephone, a removable memory card is utilized to achieve an increase in the available memory capacity of the telephone. It thereby becomes possible for the mobile telephone to store various types of data other than simply information such as telephone numbers.

Furthermore in the case of Japanese patent HEI 6-236316, an arrangement is proposed whereby various different types of data communication devices, having respectively different types of formats for handling data, can operate in common on data stored on a memory card.

However with prior art types of telephone voice recording system, the system is primarily directed towards recording the contents of telephone calls which are carried out using internal telephones (e.g., of a company or other institution). Such a system cannot be used to record the contents of telephone calls which are made using a mobile telephone via a public telephone network, i.e., without the telephone call being switched through the internal telephone switchboard of the office.

Furthermore, with a prior art type of system which applies the use of memory cards to mobile telephones, the emphasis is placed upon how to handle the data which are stored in the memory card, and no provision is made for providing an overall high degree of convenience and efficiency of utilization.

In the following description and in the appended claims, the term "internal telephone" will be used to refer to a conventional type of telephone (such as an internal telephone as mentioned hereinabove) which can be connected to a public telephone network either directly or via an internal telephone switchboard of a company or other institution, as opposed to a mobile telephone which communicates with a public telephone network by radio communication via a base station of a mobile telephone system.

Furthermore in the following description and in the appended claims, the term "voice data" of a telephone call will be used to refer to the contents of the voice communications exchanged between two telephones during that telephone call, expressed as a set of digital data, while the term "communication data" of a telephone call will be used to signify any other type of data contents, such as data expressing still or moving images which have been transmitted by a telephonic communication, in the case of a telephone having a video capability.

SUMMARY OF THE INVENTION

It is an objective of the present invention to overcome the above problems of the prior art, by providing a simple and efficient data recording system whereby the voice data or communication data contents of telephone calls which are made using a mobile telephone which communicates via a base station with a public telephone network , can be acquired by a telephone call recording apparatus and then stored in the same manner as voice data or other data contents of telephone calls which are handled by internal telephones that connect directly to the public telephone network via a local switchboard.

Basically, the invention overcomes the prior art problems by providing a system whereby each mobile telephone is equipped to utilize a memory card as a removable data storage device. When a user of a mobile telephone makes (or receives) a telephone call which is transferred through a public telephone network, the contents of that telephone call (i.e., voice signal contents, expressed as a set of digital data, or communication data contents such as a set of digital data expressing still or moving images) are stored on a memory card, in conjunction with information relating to the opposite party in the telephone call such as the name of the opposite party etc., in a predetermined data record format which is identical to that utilized by the telephone call recording apparatus when recording the contents of telephone calls made by telephones which can be connected directly to that telephone call recording apparatus. After completion of the telephone call, the telephone call data record which has been stored in the memory card is transmitted to the telephone call recording apparatus to be stored thereby. Preferably, the system is configured such the memory card can be inserted into a computer such as a portable personal computer, and transmitted to the telephone call recording apparatus via a computer network.

More specifically, according to a first aspect, the invention provides a data recording system having internal telephones of a company or other institution, a telephone switchboard for performing switching of telephone call connections of the internal telephone, for connecting these telephones to a public telephone network, and a telephone call recording apparatus for recording communication data or voice data contents of telephone calls which are performed using the internal telephones. The system further includes mobile telephones each provided with interface means for connecting to a memory card, and further preferably includes computers which are utilized in conjunction with the mobile telephones and are each provided with memory card interface means, a computer network for relaying data between computers, and a gateway for relaying data from the telephone call recording apparatus to the computer network and for relaying data from the computer network to the telephone call recording apparatus. Each mobile telephone also includes internally stored information such as a telephone directory type of database which stores data (such as names, E-mail addresses, etc.) linked to respective telephone numbers of individuals or institutions which may engage in telephone calls with that mobile telephone. Each mobile telephone also includes means for storing in a memory card a telephone call data record containing the communication data contents or voice data contents of a telephone call which is performed using that mobile telephone, and means for reading out a part of the internally stored information which relates to an opposite party of the telephone call such as the name of that opposite party, and for inserting that information into the telephone call data record. At some convenient time following completion of the telephone call, the telephone call data record is read out from the memory card and transmitted to the telephone call recording apparatus, to be stored therein in the same way as data contents of telephone calls performed using the internal telephones.

As a result, it becomes possible for a user to perform operations including recording, erasing and storing of contents of telephone calls made from a distant location using a mobile telephone, in the same manner as is applied to internal telephone calls.

According to another aspect of such a system, the mobile telephone can include means operable for selectively recording the main points, i.e., most important portions, of the contents of voice data or communication data of a telephone call. This is achieved by registering the start and end times of each main point (i.e., in response to user input commands such as predetermined key actuations) in relation to the start of recording the contents of the telephone call. That is to say, each start point or end point of recording a main point of the telephone call contents is registered as an amount of time that has elapsed from the start of recording the telephone call contents. These elapsed time values are stored in a telephone call data record on a memory card together with the recorded telephone call data contents, and so can be subsequently transmitted together with the telephone call data contents to the telephone call recording apparatus. The telephone call recording apparatus can thereby extract the main point data portions from the entire telephone call data contents, without the need to actually transmit the data contents of the main points to the telephone call recording apparatus. In addition, the mobile telephone includes means for extracting these main point data portions from the memory card data, after completion of the telephone call, and storing the main point data in an internal memory of the mobile telephone. The user of the mobile telephone can thereby listen to or otherwise utilize the main point data contents, with only a small amount of internal memory capacity being required to achieve that. In that way, the amount of data which must actually be transmitted from the memory card to the telephone call recording apparatus to transmit the recorded main point contents is minimized, while in addition the internal memory capacity requirements of the mobile telephone are also minimized. Furthermore the user can act on the contents of the recorded telephone call more efficiently, since it becomes unnecessary for the user to listen to the entire telephone call contents in order to recall the main points of the call contents. In addition, it becomes unnecessary to store non-essential data (i.e., the main point data contents, separate from the entire recorded telephone call data contents) in the memory card.

According to another aspect of such a system, the system can be configured such that when a user of a mobile telephone inserts a memory card having a telephone call data record stored thereon into a computer that is connected for communication with the telephone call recording apparatus, identifier information concerning that user and concerning the opposite party of the telephone call corresponding to that stored data record, together with information specifying the time at which the telephone call contents started to be recorded, are transmitted to the telephone call recording apparatus. The telephone call recording apparatus is provided with means for then determining whether there is a telephone call data record stored therein of a telephone call with that opposite party, which started to be recorded prior to that of the telephone call whose contents are stored on the memory card, then that telephone call data record which is being held stored at the telephone call recording apparatus is transmitted to the computer, to be stored in the memory card.

In that way, the user of the mobile telephone can always obtain the most up-to-date telephone call contents relating to a specific individual, such as a business client.

According to another aspect of the invention, when a telephone call which is being made using a mobile telephone is transferred to an internal telephone, then the first part of that telephone call is recorded on a memory card and subsequently transmitted to the telephone call recording apparatus, while the telephone call recording apparatus records the second portion of the transferred telephone call, and subsequently combines these first and second portions, and stores the combined data as the contents of a single telephone call.

These and other aspects of the invention will become more apparent from the following description of preferred embodiments.

BRIEF DESCRIPTION OF THE DRAWINGS

FIG. 3 is a system block diagram of a telephone switchboard in the first embodiment;

FIG. 4 is a system block diagram of a telephone call recording apparatus in the first embodiment;

DESCRIPTION OF PREFERRED EMBODIMENTS

First Embodiment

Figure 1:
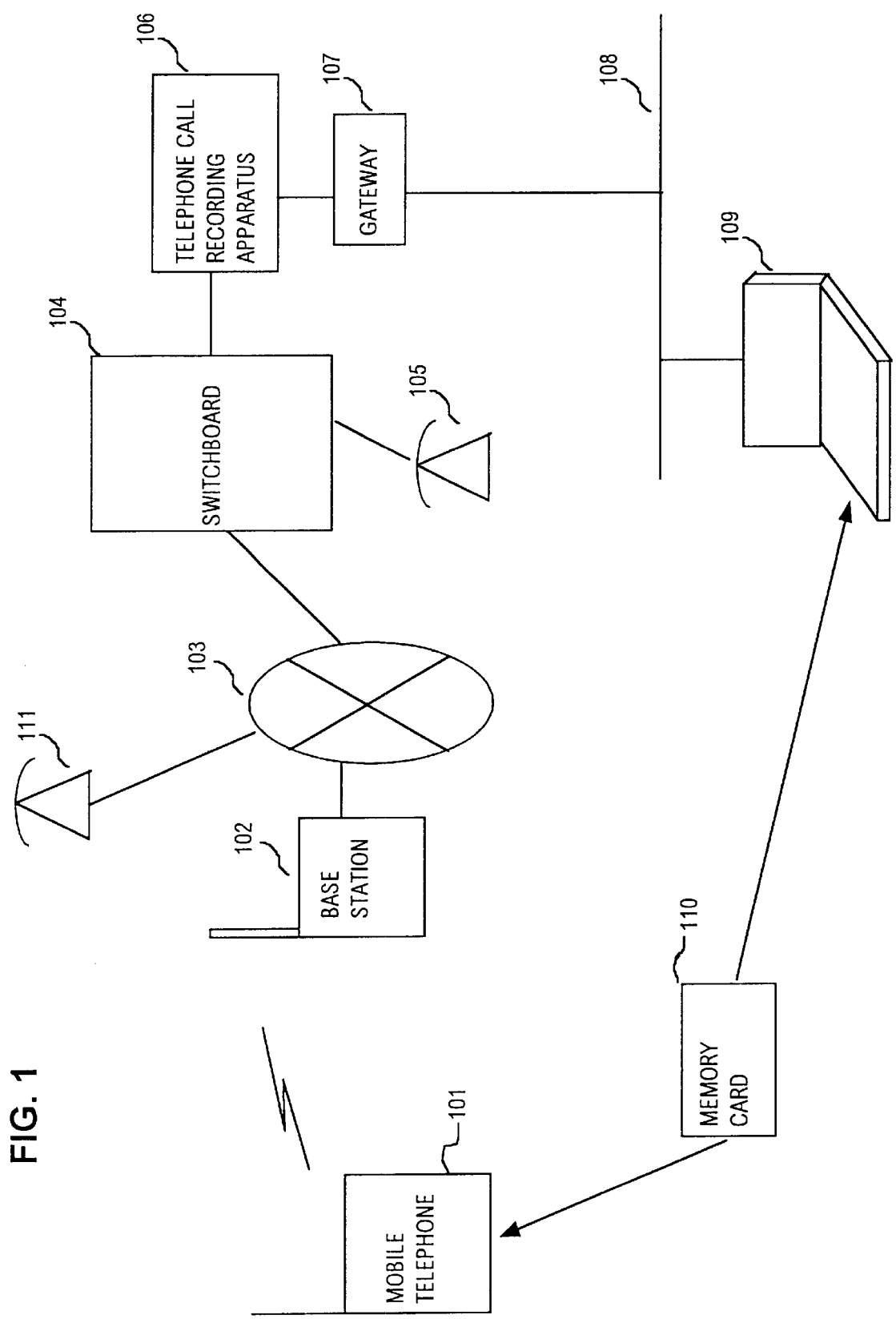
FIG. 1 is a conceptual system block diagram of a first embodiment of a data recording system according to the present invention.

FIG. 1 is a conceptual system block diagram showing the overall configuration of a first embodiment of a data recording system. This system includes a plurality of mobile telephones 101 (with only one of these being represented in the drawing) each provided with an interface for performing voice communications via a radio link to at least one base station 102 and an interface for connecting to a memory card 110. Each of the base stations 102 transmits radio waves to communicate with and supervise all mobile telephones 101 that are within the service area of that base station, and provides a line switching function (i.e., a call connection function) to each of the mobile telephones 101 that is supervised thereby. The system further includes a public telephone network 103 which performs line switching operations for the plurality of base stations 102, and which also performs line switching operations for a plurality of external telephones 111 (with only one of these being shown in the drawing) and a switchboard 104 which performs line switching operations between the public telephone network 103 and each of a plurality of internal telephones 105 (with only one of these being shown in the drawing). It should be understood that the term "internal telephone" as used in the following description and appended claims refers to one of a set of telephones which connect via the same local switchboard to a public telephone network. The system further includes a telephone call recording apparatus 106, for recording the contents of voice telephone calls or other types of data communications performed using the internal telephones 105 and for storing the recorded data. The system also includes a gateway 107 which functions as an interface for transferring data that have been recorded by the telephone call recording apparatus 106 to a computer network 108, and for transferring data received from the computer network 108, to be recorded by the telephone call recording apparatus 106. The computer network 108 serves as a data communication interface between the gateway 107 and a plurality of personal computers 109 (with only one of these being shown in the drawings). Each computer 109 is connected to the computer network 108 for data transfer, and is provided with an interface (not shown in the drawing) for utilizing a memory card 110, i.e., into which a memory card 110 can be inserted and connections made thereto, and the data stored in the memory card 110 thereby accessed. It should be understood that the "telephone 111" shown in FIG. 1 conceptually represents any telephone (fixed-line or mobile) other than the mobile telephone 101 or the internal telephones 105, which can establish a communication connection via the public telephone network 103. Each mobile telephone 101 contains an internal memory (not shown in the drawing). Each memory card 110 is a read/write type of memory card, with data that are written into/read out from the memory card being obtained from or supplied to the internal memory of a mobile telephone 101 when the memory card 110 has been inserted into that mobile telephone 101, or obtained from or supplied to a computer 109, when the memory card 110 has been inserted into that computer 109.

For simplicity of description it will be assumed in the following that each memory card 110 stores a single telephone call data record, containing telephone call data of a single call, with the user of the memory card 110 (i.e., the recording individual) and the opposite party in the telephone call being respectively identified in some manner within the telephone call data record. However the invention is not limited to the use of such a format for storing telephone call data contents on a memory card.

Figure 2:
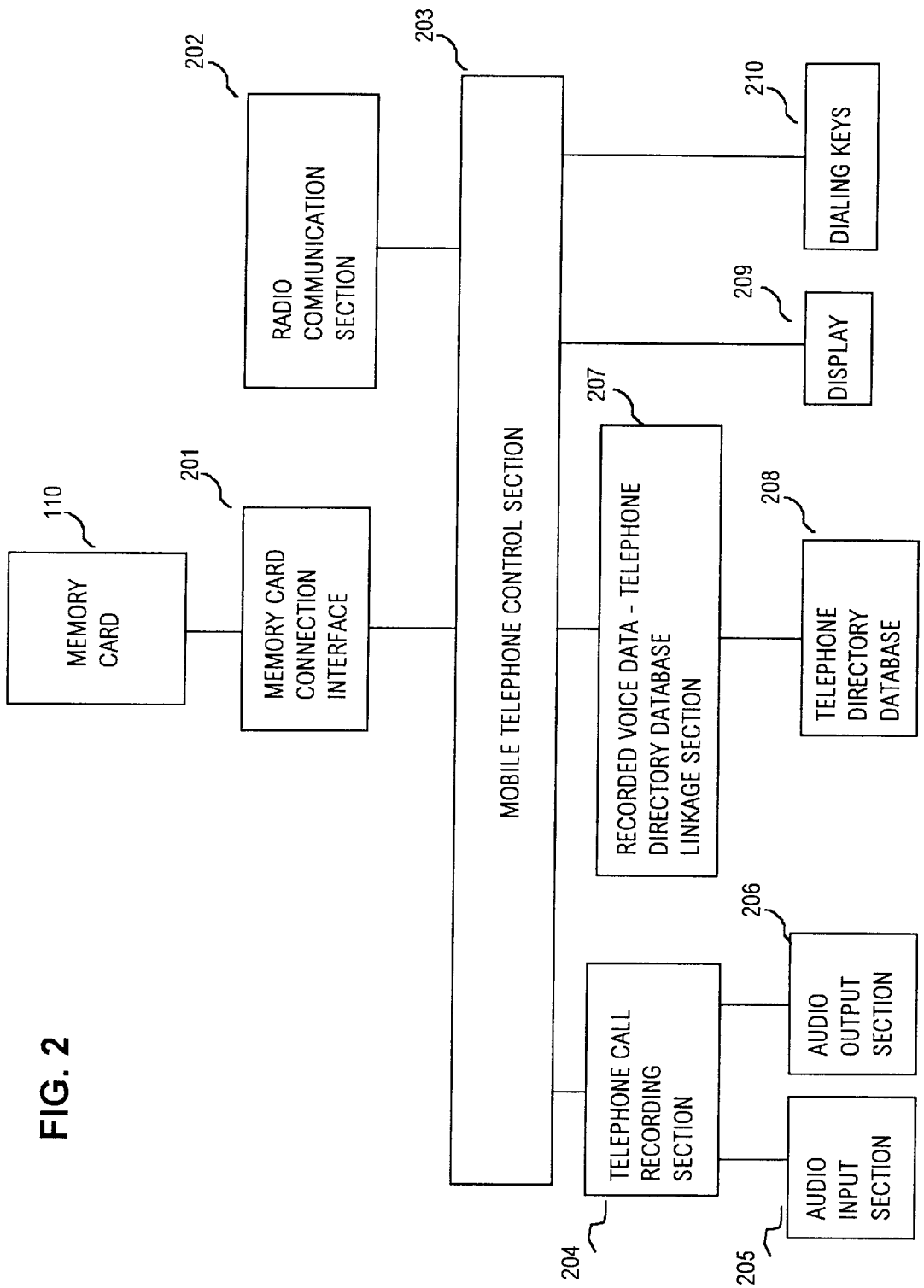
FIG. 2 is a system block diagram of a mobile telephone in the first embodiment.

As shown in FIG. 2, the mobile telephone 101 includes a memory card connection interface 201 for mounting a memory card 110 (i.e., for insertion and connection, as described hereinabove), a radio communication section 202 which serves as an interface with a base station 102, a mobile telephone control section 203 which controls the overall operation of the mobile telephone 101, a telephone call recording section 204 for recording and storing the contents of telephone calls as voice data, an audio input section 205 having a telephone microphone, etc., an audio output section 206 having a telephone loudspeaker, etc., a recorded voice data—telephone directory database linkage section 207 for linking the contents of a telephone call recorded by the telephone call recording section 204 with the telephone number of the opposite party in that telephone call and predetermined data such as identifier information concerning that opposite party, with a list of data relating respective telephone numbers to such identifier information for potential opposite parties being held stored in a recorded voice data—telephone directory database 208. That is to say, the recorded voice data telephone directory database 208 has stored beforehand therein a list of telephone numbers of individuals or institutions who may potentially become opposite parties in telephone calls performed by the user of that mobile telephone, with each telephone number associated with a set of information such as a name, etc., which identifies that potential opposite party, or other information concerning that individual or institution. In particular, the recorded voice data—telephone directory database 208 can have stored beforehand therein (in conjunction with the respective telephone numbers of business clients) identification information or electronic mail addresses of clients, in the case of a mobile telephone which is used for business purposes. The mobile telephone 101 further includes a display device 209, and dialing keys 210 for use in inputting data such as telephone numbers and commands for controlling operation of the mobile telephone.

As shown in FIG. 3, the switchboard 104 is formed of a public telephone network communication control section 301 which performs control of communication via the public telephone network 103, an internal telephone communication control section 302 which performs communication control of the internal telephone 105, a telephone call recording apparatus communication control section 303 which performs communication control of the telephone call recording apparatus 106, and a public telephone network communication control section 304 which performs overall control of the telephone switchboard 104.

As shown in FIG. 4, the telephone call recording apparatus 106 is formed of a switchboard communication control section 401 which performs control of communication via the switchboard 104, a gateway communication control section 402 which performs communication control of the gateway 107, a telephone call recording section 403 for recording the contents of telephone calls which are made by an internal telephone 105 and for storing the call contents as a data record, and a telephone call recording apparatus control section 404 which performs overall control of the telephone call recording apparatus 106.

Figure 5:
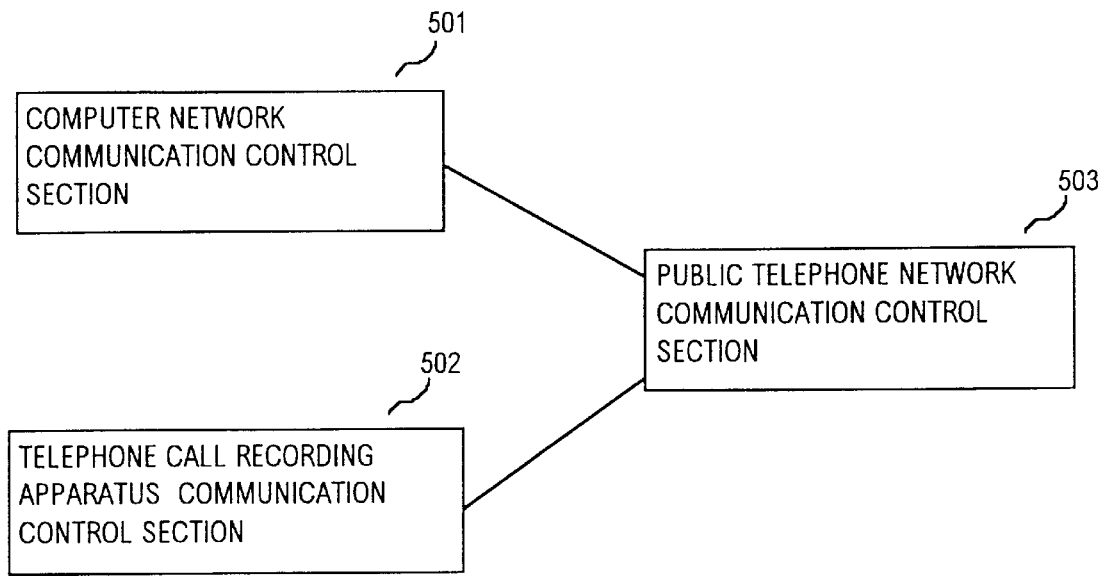
FIG. 5 is a system block diagram of a gateway in the first embodiment.

As shown in FIG. 5, the gateway 107 is formed of a computer network communication control section 501 which performs control of communication via the computer network, a telephone call recording apparatus communication control section 502 which perform communication control of the telephone call recording apparatus 106, and a public telephone network communication control section 503 which performs overall control of the gateway 107.

The operation of this data recording system embodiment is as follows. Firstly, the operation for recording the contents of a telephone call made using an internal telephone 105 (i.e., a telephone call which is handled by an external telephone 111 and the switchboard 104) and for storing the recorded contents by the telephone call recording apparatus 106, will be described. When a telephone call is to be made from an external telephone 111 to an internal telephone 105, the external telephone 111 initiates the call by sending the telephone number of the switchboard 104 to the public telephone network 103, which then sends a notification (i.e., as an electrical signal) of this call to the switchboard 104. When the switchboard 104 receives this notification, the telephone call recording apparatus communication control section 303 of the switchboard 104 controls the internal telephone communication control section 302 such that the appropriate one of the internal telephones 105 (i.e., a telephone whose number has been assigned to a specific individual, as described in the following) is notified that a call has been received. A user then sets that internal telephone 105 in the off-hook condition, whereupon the public telephone network communication control section 304 of the switchboard 104 controls the public telephone network communication control section 301 such as to establish a communication path between the calling external telephone 111 and that internal telephone 105. At this time, the public telephone network communication control section 304 receives identification information such as the telephone number of the calling external telephone 111, from the public telephone network 103, and records that information.

If it is required to record the contents of the telephone call, the user actuates a predetermined operating key (not shown in the drawing) of the internal telephone 105 to thereby send a "telephone call recording start" request to the internal telephone communication control section 302 of the switchboard 104. When the public telephone network communication control section 304 detects that this request has been received, it sends a "telephone call recording start" instruction to the telephone call recording apparatus communication control section 303, and also notifies the telephone call recording apparatus communication control section 303 of the information necessary for specifying the calling party (e.g., information such as the telephone number of the calling external telephone 111) and also notifies the telephone call recording apparatus communication control section 303 of any identification information (such as the internal telephone number of the internal telephone 105 to which this call has been connected) that may be required for specifying the individual who is receiving the call.

A "telephone call recording start" instruction is then sent from the telephone call recording apparatus communication control section 303 to the telephone call recording apparatus 106, and is received by the telephone call recording apparatus control section 404 of the telephone call recording apparatus 106 via the switchboard communication control section 401. The telephone call recording apparatus control section 404 sends the "telephone call recording start" instruction to the telephone call recording section 403, and also notifies the telephone call recording section 403 of information such as the internal telephone number of the internal telephone 105 to which the call is being connected, e.g., to identify the person who is receiving the call, and information such as the telephone number of the external telephone 111, to specify the calling individual. The telephone call recording section 403 of the telephone call recording apparatus 106 then begins to record the telephone call contents, and to store these as a data record.

Figure 7:
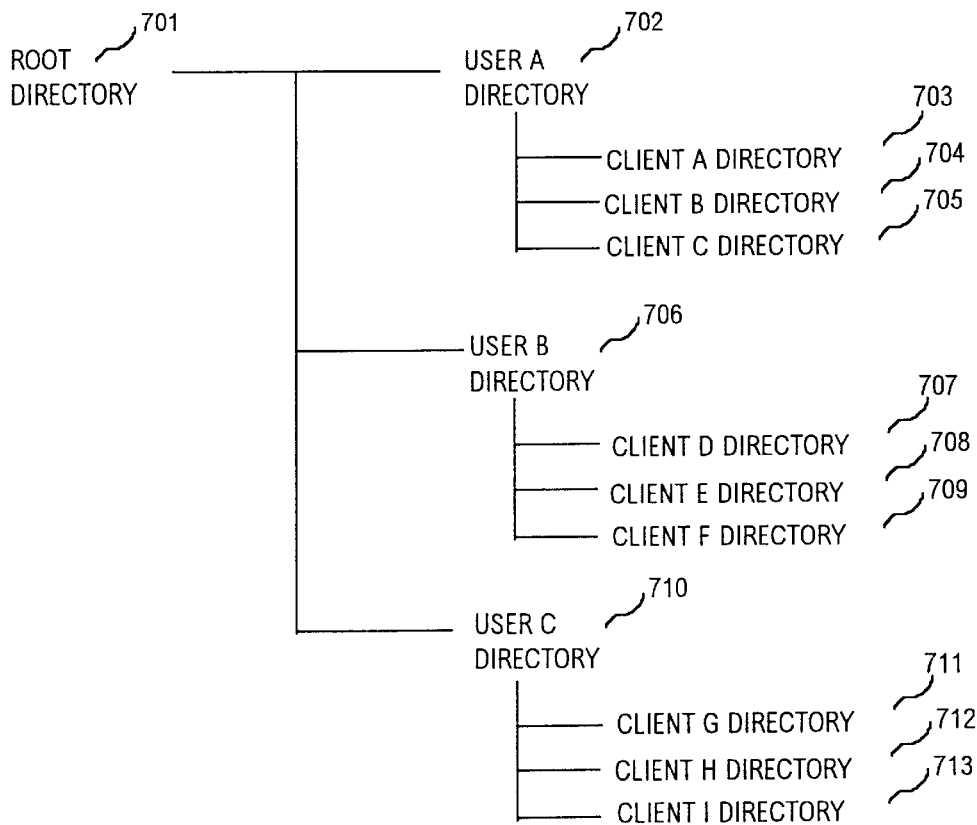
FIG. 7 shows an example of a data directory arrangement for storing data of respective telephone calls in the telephone call recording apparatus of the first embodiment.

FIG. 7 shows an example of the format of a data directory structure for storage of telephone call data that have been recorded by the telephone call recording section 403. In FIG. 7, 701 denotes a root directory, 702, 706, 710 are directories of respective users, with each user being assigned the telephone number of a predetermined corresponding one of a plurality of internal telephones 105. It will be assumed that the switchboard 104, telephone call recording apparatus 106 and each of the internal telephone 105 are located within a company, with the aforementioned users being respective staff members of that company, and that 703 to 705, 707 to 709, and 711 to 713 are respective sets of directories of clients of that company, with these sets of client directories respectively corresponding to the various users, who are indicated in FIG. 7 as "user A", "user B" etc. Each of the clients (respectively indicated in FIG. 7 as "client A", "client B", etc.,) can for example be identified within the data directory structure by the telephone number and name of that client.

When the telephone call recording is to be ended, the user of the internal telephone 105 which is handling the call actuates a predetermined operating key (not shown in the drawing) whereby a "telephone call recording end" request is sent from that internal telephone 105 and transferred to the telephone call recording section 403 of the telephone call recording apparatus 106 via the same path as that over which the "telephone call recording start" request was sent. Telephone call recording is thereby terminated.

Next, the operation will be described whereby the contents of a telephone call made between a mobile telephone 101 and an external telephone 111 are recorded using a memory card 110, and the contents of that telephone call then stored as data in the telephone call recording apparatus 106. It will be assumed that the user of an external telephone 111 is the calling party, in which case that external telephone 111 first transmits the telephone number of the called mobile telephone 101 to the public telephone network 103. The mobile telephone control section 203 of the called mobile telephone 101 then receives notification (via a base station 102, and the radio communication section 202 of that mobile telephone 101) from the public telephone network 103 that a telephone call is being received, and the mobile telephone control section 203 then notifies the mobile telephone user of the incoming call, such as by sending a signal whereby a dialing tone is audibly emitted by the audio output section 206. When the user then sets the mobile telephone in the off-hook status (e.g., by actuation of a predetermined one of the dialing keys 210) a communication path is established between the mobile telephone 101 and the public telephone network 103. At this time, the mobile telephone control section 203 receives from the public telephone network 103 the telephone number of the calling external telephone 111, and stores that telephone number for use in identifying the opposite party.

If the contents of this telephone call are to be recorded, then the user of the mobile telephone 101 actuates a specific key, e.g., a predetermined one of the dialing keys 210, whereby a "telephone call recording start" request is sent to the mobile telephone control section 203. When the mobile telephone control section 203 detects that this "telephone call recording start" request has been sent, it sends a "telephone call recording start" instruction to the recorded voice data—telephone directory database linkage section 207, and also notifies the recorded voice data—telephone directory database linkage section 207 of the telephone number of the calling external telephone 111. When the recorded voice data telephone directory database linkage section 207 receives the "telephone call recording start" instruction, it acquires from the recorded voice data— telephone directory database 208 more detailed information concerning the calling party who is using the external telephone 111, if such information has been already stored within the recorded voice data—telephone directory database 208. Such information can for example be a name or other identifier information concerning a client as mentioned above, or the electronic mail address of a client, etc. The recorded voice data—telephone directory database linkage section 207 then supplies this information to the telephone call recording section 204. When the telephone call recording section 204 receives this information concerning the calling party, the information is also transferred via the mobile telephone control section 203 and memory card connection interface 201 to be stored in the memory card 110, and the telephone call recording section 204 then acquires the voice signals of the telephone call, from the audio input section 205 and the audio output section 206, and begins to record the telephone conversation contents as voice data. These voice data (or other data contents of the telephone call) are transferred to the memory card 110 via the mobile telephone control section 203 and the memory card connection interface 201, and stored in the memory card 110. An internal memory of the telephone call recording section 204 (not shown in the drawing) may be utilized for intermediate storage of the telephone call data contents, in this process.

When the telephone call recording is to be ended, this is initiated by the user actuating a specific key, e.g., a predetermined one of the dialing keys 210, whereby a "telephone call recording end" request is supplied from the dialing keys 210 to the mobile telephone control section 203. When the mobile telephone control section 203 detects that this request has been received, it supplies a the "telephone call recording end" instruction to the telephone call recording section 204, whereby recording of the telephone call is terminated.

Figure 6:
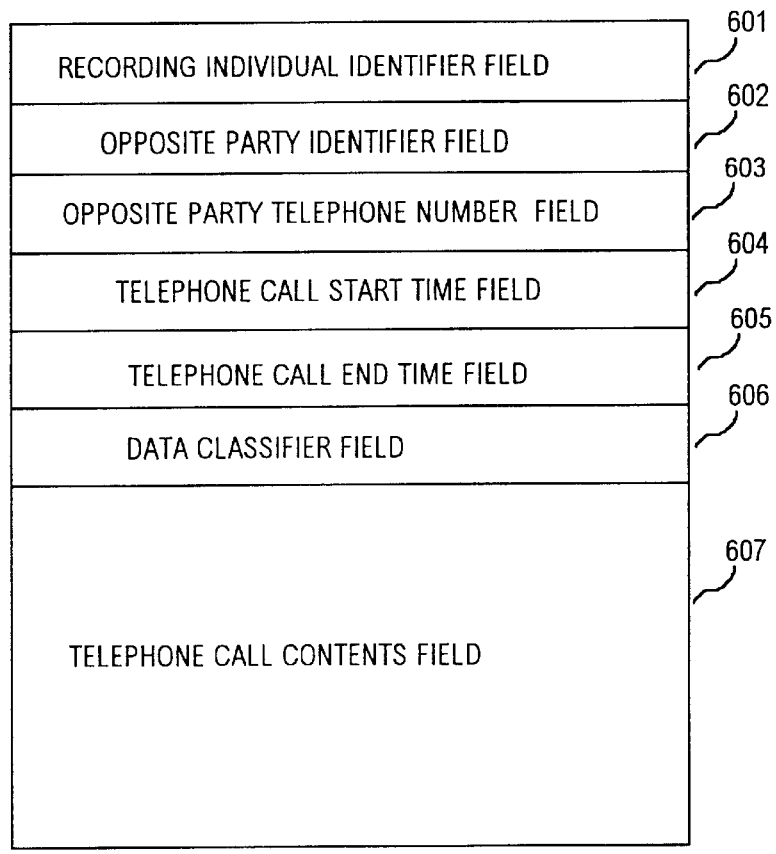
FIG. 6 shows an example of the format of a telephone call data record which is stored on a memory card, with the first embodiment.

FIG. 6 shows an example of the format of a telephone call data record which is stored on a memory card, containing the contents of a telephone call made by a mobile telephone 101. In FIG. 6, 601 denotes a recording individual identifier field of that data record, which contains identifier information that specifies the user of the mobile telephone 101 from which these telephone call data have been loaded into the memory card, such as the telephone number assigned to the mobile telephone, the name of the user and/or other identification information concerning the user. 602 denotes an opposite party identifier field, which contains information specifying the opposite party in the telephone call, such as the name, client identifier, or electronic mail address, etc., of the opposite party, read out from the recorded voice data— telephone directory database 208 by the recorded voice data—telephone directory database linkage section 207 as described by utilizing the telephone number of that opposite party. 603 denotes an opposite party telephone number field, containing the telephone number of the opposite party. 604 denotes a telephone call starting time field which contains the year, date and time of day at which recording of the telephone call was started, with these data being written in by the mobile telephone control section 203 of the mobile telephone 101. 605 denotes a telephone call end time field, containing the year, date and time of day of termination of the telephone call recording. Numeral 606 denotes a data classification field which contains information specifying the type of encoding that was used in recording the telephone call contents and storing these as data, such as the CODEC type, and any other information which may be required in order to decode or decompress the stored telephone call data contents or to transfer these data to be stored in some other form of data storage medium. The information in the data classification field 606 are also written in by the mobile telephone control section 203. Numeral telephone call contents field 607 denotes a call contents recording field, containing data (in this example, assumed to be voice data) constituting the actual recorded telephone call contents.

In that way, the contents of the telephone call carried out between an external telephone 111 and a mobile telephone 101 are stored as data on a memory card 110.

When the memory card 110 having telephone call voice data recorded therein is then inserted into a computer 109 to be connected thereto, the computer 109 reads out the telephone call data record that has been stored in the memory card 110, and transmits its contents to the computer network communication control section 501 of the gateway 107, via the computer network 108. This operation may for example be initiated by the user performing predetermined keyboard input operations on the computer 109 when the memory card 110 has been inserted therein The public telephone network communication control section 503 of the gateway 107 converts the data encoding format of the telephone call contents field 607 from that specified in the data classifier field 606 to a type which is suitable for use by the telephone call recording apparatus 106, with the public telephone network communication control section 503 utilizing the information contained in the data classifier field 606 to perform that format conversion. The public telephone network communication control section 503 then controls the telephone call recording apparatus communication control section 502 of the gateway 107 to transmit the resultant format-modified telephone call data record to the gateway communication control section 402 of the telephone call recording apparatus 106.

The telephone call recording apparatus control section 404 of the telephone call recording apparatus 106 then controls the telephone call recording section 403 to store the received telephone call data record in one of the client data directories (e.g., one of the set 702, 703 etc., or the set 707, 708, etc.) shown in FIG. 7 and described above, i.e., to a data directory assigned to a client who corresponds to the opposite party identified in that telephone call data record, with that client data directory being within a user data directory that corresponds to the user who has transmitted that telephone call data record. This allocation of the telephone call data record to a specific data directory is performed by the telephone call recording apparatus control section 404 based on the contents of the recording individual identifier field 601 and the contents of at least one of the opposite party identifier field 602 and opposite party telephone number field 603.

In that way, with this system embodiment, the data stored in a memory card can be recorded by the telephone call recording apparatus, in the same way as the contents of a telephone call carried out between an external telephone and an internal telephone. As a result, the contents of a telephone call which is performed by an individual using a mobile telephone and is linked to a public telephone network via a base station of the mobile telephone system while that individual is at a remote location, can be recorded and can be subsequently listened to, saved, deleted, etc., in the same way as the contents of a telephone call which is performed by that individual at a usual location (i.e., the place of business of that individual) using an internal telephone which is linked to the public telephone network via a telephone switchboard at that location.

Referring to FIG. 7 for example, irrespective of whether user A receives a telephone call from client A (i.e., received by an internal telephone 105 that is assigned to user A, and sent from client A by using an external telephone 111) while user A is situated at his or her place of business, or that telephone call is received by the mobile telephone of user A while he or she is at a remote location, the contents of that telephone call can be recorded and stored in the data directory corresponding to client A, within the user data directory corresponding to user A, in the telephone call recording section 403 of the telephone call recording apparatus 106. In either case, the telephone call contents will be stored in the same way, i.e., as part of a telephone call data record which can also contain various types of information relating to client A. It will be apparent that this capability is extremely valuable and useful to such a type of mobile telephone user.

In the above, a description has been given for the case in which a telephone call is recorded when the call is made (i.e., initiated) from an external telephone 111 to a mobile telephone 101. However, the same type of operation can be achieved for the case in which a telephone call is made from a mobile telephone 101 to an external telephone 111.

Also in the above, the description has been given for the case in which the data stored in a memory card are transferred to the telephone call recording apparatus via a personal computer, computer network and a gateway. However it would be equally possible to arrange to transfer these data from the mobile telephone, i.e. via the base station 102 of the mobile telephone system, the public telephone network 103, and the internal switchboard 104, to a telephone call recording apparatus such as the telephone call recording apparatus 106, with the telephone call recording apparatus 106 having been configured to receive such data transferred via the switchboard 104.

The above embodiment has been described above for the case in which only telephone call voice data are stored and are linked to identification information, by using memory cards and a telephone call recording apparatus. However the embodiment could equally be utilized for the storage (and linkage to identification information) of communication data, i.e., non-voice data such as data expressing still pictures and/or moving pictures, for application to telephones having a video display capability and a video data transmission function.

Furthermore with the above embodiment, a telephone call data record that is transmitted from a memory card to the telephone call recording apparatus 106 includes a recording individual identifier fields, an opposite party identifier field, and an opposite party telephone number field, whose respective contents are used by the telephone call recording apparatus 106 to assign the data contents of that telephone call to an appropriate storage location, e.g., in one of the client data directories shown in FIG. 7. Thus, the telephone call recording apparatus 106 could readily be configured to compare the contents of these fields, when a telephone call data record is transmitted from a memory card, with the contents of a telephone directory database that is used by the telephone call recording apparatus 106, e.g., which is stored in the telephone call recording section 403 shown in FIG. 4. The contents of that telephone directory database could then be updated with the contents of these data fields of the received telephone call data record, i.e., by transferring the contents of the opposite party identification field and opposite party telephone number field from the memory card, if the information contained in these fields is not yet held in that telephone directory database of the telephone call recording apparatus 106. In that way, it can be ensured that the telephone call recording apparatus 106 always contains up-to-date telephone directory information concerning individuals or institutions such as business clients, who are potential opposite parties in telephone communications with the users of the telephone call recording apparatus 106.

Second Embodiment

A second embodiment of the invention will be described whereby specific recorded telephone call data stored in a telephone call recording apparatus can be transferred to a memory card that is utilized with a mobile telephone, but whereby unnecessary transfer of such data is eliminated.

The overall configuration of the system (FIG. 1), the configuration of a mobile telephone 101 (FIG. 2), the configuration of a switchboard 104 (FIG. 3), the configuration of a gateway 107 (FIG. 5), the data format of the memory card 110 (FIG. 6), and the directory arrangement for storing telephone call voice data in the telephone call recording apparatus 106 (FIG. 7), with this embodiment, are respectively identical to those of the first embodiment so that detailed description will be omitted. For ease of description of this embodiment, it will be assumed that the telephone call recording apparatus 106 is located at a business office and that the users of the mobile telephones 101 are respective staff members of that business. It will be further assumed that each memory card 110 is required to always have stored therein, for each of a plurality of clients who are assigned to the user of that memory card 110 (such as clients A, B, C of user A in the directory example of FIG. 7) the data of the most recent telephone call that has been exchanged with that client through use of the mobile telephone 101 which is assigned to that user or use of the internal telephone 105 which is assigned to that user. It should be noted that with this embodiment the telephone call recording apparatus 106 is configured such that, when an individual other than the user to which an internal telephone 105 is assigned answers a telephone call that is received by that telephone 105 (e.g., when the assigned user is at a remote location), and that individual inputs a request to the telephone call recording apparatus 106 for recording of the contents of that call, the telephone call recording apparatus 106 will store the data contents of that telephone call in the appropriate client data directory within the user data directory of the user who is assigned that internal telephone 105. For example referring to FIG. 7, if user B receives a telephone call from client A of user A at the telephone 105 which is assigned to user A, then if user B designates to the telephone call recording apparatus 106 that the call contents are to be recorded, the data of that telephone call will be stored in the client A directory within the user A directory.

Furthermore with this embodiment, referring to the client directories 703 to 713 shown in FIG. 7, if there are a plurality of telephone calls that are currently registered in a client data directory (i.e., a plurality of telephone calls which have been successively exchanged with that particular client), then the recorded data of one of these telephone calls is registered with a data status (e.g., in a specific field of the stored telephone call data record of that call) referred to in the following as the "most recent call" status, which specifies that this is the most recent telephone call to have been exchanged with that client. All other telephone call data records are registered with a "previous call" status.

Figure 8:
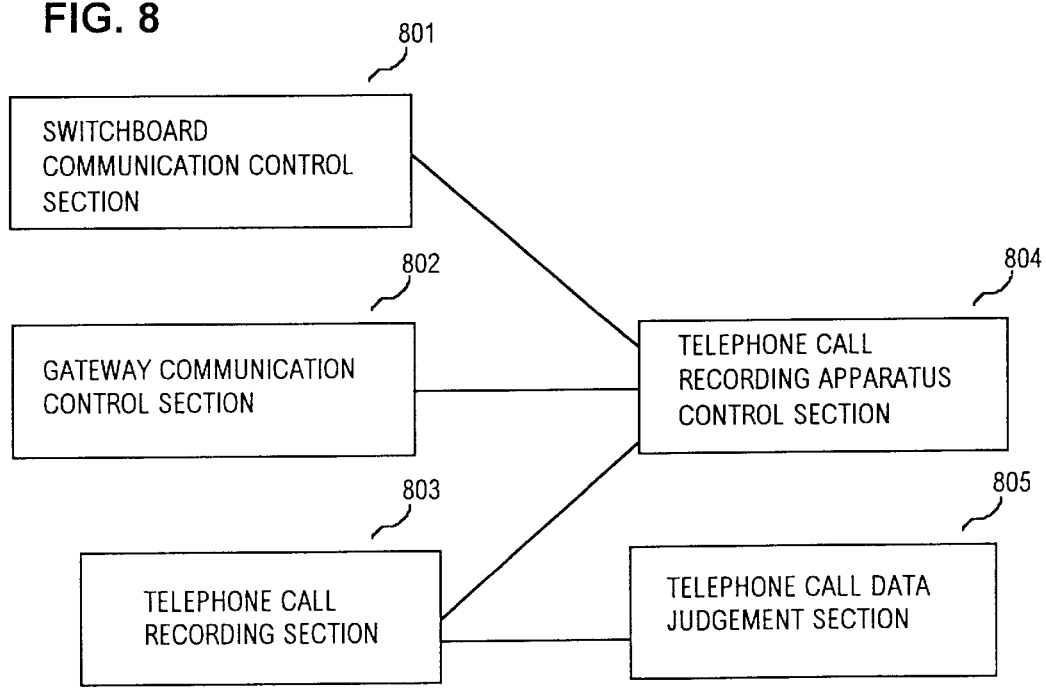
FIG. 8 is a system block diagram of a telephone call recording apparatus in a second embodiment.

FIG. 8 shows the configuration of the telephone call recording apparatus 106 of this embodiment. This is formed of a switchboard communication control section 801 which performs control of communication via the switchboard 104, a gateway communication control section 802 which performs communication control of the gateway 107, a telephone call recording section 803 for applying data recording to the internal telephone 105 and for storing the resultant telephone call data records, a telephone call recording apparatus control section 804 which performs overall control of the telephone call recording apparatus 106, and a telephone call data judgement section 805 which judges the relationship between recorded voice data stored in the memory card 110 and recorded voice data which have been stored in the telephone call recording apparatus 106.

Figure 9:
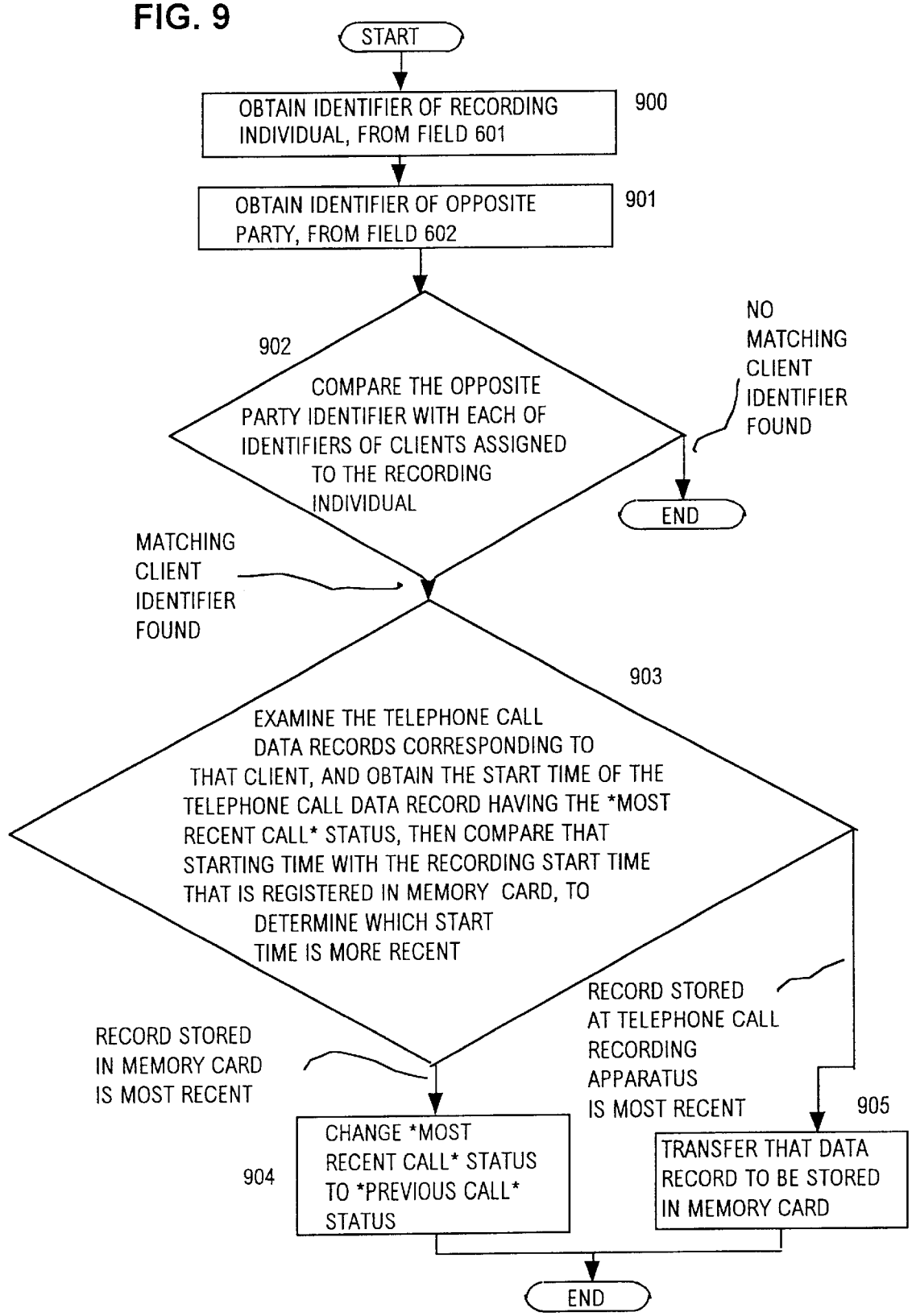
FIG. 9 is a flow diagram of processing which is performed by the telephone call recording apparatus to judge the contents of a telephone call data record, with the second embodiment.

The operation of the telephone call recording apparatus 106 of this data recording system will be described referring to the simple flow diagram of FIG. 9, assuming that telephone call data are stored in the telephone call recording apparatus 106 using the directory arrangement shown in FIG. 7, that a mobile telephone 101 is being used by user A of the directory example shown in FIG. 7, and that recently recorded voice data of a telephone call made between that mobile telephone 101 and one of the clients of user A have been stored in the memory card 110, and the memory card 110 has then been inserted into a computer 109. It will further be assumed that the voice data have been recorded in the memory card 110 using the data format shown in the example of FIG. 6.

When the memory card 110 is extracted from the mobile telephone 101 and inserted into the computer 109, the computer 109 of this embodiment then sends a memory card insertion notification to the telephone call recording apparatus control section 804, via the gateway 107 and the gateway communication control section 802, together with the contents of the recording individual identifier field 601, the opposite party identifier field 602 and the telephone call start time field 604 of the telephone call data record stored in memory card 110. When the telephone call recording apparatus control section 804 receives this notification that a memory card has been inserted, it controls the telephone call data judgement section 805 to perform judgement processing of data already stored within the telephone call recording section 803 and parts of the data held in the memory card 110, as follows. Firstly (step 900 in FIG. 9) the telephone call data judgement section 805 examines the contents of the recording individual identifier field 601 of the memory card 110, to thereby identify the user of the memory card 110, assumed in this case to be user A, corresponding to the "user A" directory 702 in the telephone call recording section 803. Next, step 901 is performed, to identify the opposite party in the recorded telephone call, from the contents of the opposite party identifier field 602. A comparison judgement step 902 is then performed between the identification information thus obtained (e.g., a client name) and the identities of the clients in the user A directory. It will be assumed for example that the opposite party in the telephone call is client A, i.e., matches the "client A" directory 703 within the "user A" data directory.

If at that time there is a set of recorded telephone call data relating to the client A already stored within the telephone call recording section 803, which has been assigned the aforementioned "most recent call" status to designate it as the most recent to have been exchanged with client A, then (step 903) the telephone call data judgement section 805 compares the contents of the telephone call start time field 604 of the recorded telephone call data from memory card 110, i.e., data specifying the time at which recording of that telephone call was started by the mobile telephone 101, with the time at which recording of the call data contents of the telephone call data record having the "most recent call" status was started (with the latter starting time information being obtained from the telephone call recording section 803). If it is found as a result of this judgement that the recording start time of that "most recent call" recorded telephone call data held in the telephone call recording section 803 is subsequent to the recording start time specified in the telephone call start time field 604 of the memory card 110, then this is taken as signifying that any necessary actions relating to the contents of that telephone call have not yet been taken by user A, since user A has not yet responded to the most recent telephone call from that client. Hence, it is necessary to transmit that "most recent call" telephone call data record relating to client A from the telephone call recording section 803 to the memory card 110. Hence, when such a condition is detected (in step 903 of FIG. 9) the telephone call data judgement section 805 sends to the telephone call recording apparatus control section 804 a request for the recorded telephone call data having the status "most recent call" in the "client A" directory of the telephone call recording section 803 to be transmitted to the memory card 110 of user A. In response, the telephone call recording apparatus control section 804 sends a data transmission instruction to the telephone call recording section 803 (step 905 in FIG. 9) whereupon the telephone call recording section 803 transmits the requisite recorded telephone call data to the memory card 110 via the gateway communication control section 802, gateway 107, the computer network 108, and the computer 109.

In that way, when that memory card 110 is then re-inserted into the mobile telephone 101 of user A, user A is provided with the most up-to-date telephone call contents relating to client A, and can then listen to these call contents and take any necessary action based on these contents.

Conversely, if it is found in step 903 that the start of recording the telephone call data relating to client A which are held in the memory card 110 is subsequent to the start of recording the aforementioned recorded telephone call data having the "most recent call" status in the "client A " directory, it will be judged that some action (for example, such as responding to a query from client A) has already been taken by user A, i.e., through the most recent telephone call which has been exchanged between user A and client A by using the mobile telephone 101. This signifies that:

(a) there is no need for the aforementioned telephone call data record which is currently registered with the "most recent call" status in the "client A" directory to be transferred to the memory card 110 of user A, and (b) that telephone call data record should no longer have the "most recent call" status.

When (step 904 in FIG. 9) the telephone call data judgement section 805 notifies the telephone call recording apparatus control section 804 of this condition, the telephone call recording apparatus control section 804 controls the telephone call recording section 803 to perform processing to remove the "most recent call" registered status and assign a "previous call" registered status to that telephone call data record corresponding to client A in the user A data directory, and does not transmit that data record to the computer 109 to be stored in the memory card 110.

Thus with this embodiment, when a memory card 110 is inserted into a computer 109, the memory card 110 is updated with the most recent telephone call data record (held in the telephone call recording section 803 of the telephone call recording apparatus 106) for the opposite party who is identified in that memory card 110 (i.e., in field 602) only if it is actually necessary to perform that updating, as determined by whether or not that data record held in the telephone call recording section 803 was recorded prior to the aforementioned telephone call data record that is currently stored in the memory card 110 and is registered with the "most recent call" status. That is to say, if the user of the memory card 110 has already contacted the aforementioned opposite party, it can be assumed that there is no need for the user to receive and process the telephone call data record relating to that opposite party which is held in the telephone call recording section 803. Hence, the transfer of unnecessary telephone call data for updating the contents of the memory card 110 can be eliminated, and the user need only operate on telephone call data which are actually necessary, thereby increasing efficiency.

In the above description it has been assumed that the act of inserting a memory card 110 into a computer 109 results in a signal being automatically sent to notify the telephone call recording apparatus 106 that such insertion has occurred and that it is required to begin the updating processing operations of the second embodiment, if appropriate, as described above. However in practice of course, it could readily be arranged that this notification occurs when the user performs predetermined key actuations of the computer 109 after inserting the memory card 110.

Third Embodiment

A third embodiment of a data recording system according to the present invention will be described in the following, whereby a mobile telephone can perform recording of main points of a telephone call (where the term "main points" is used herein to signify respective essential portions of the contents of a telephone call, which constitute the gist of the call contents), enabling each of these main points to be listened to or operated on by the user of the mobile telephone after recording of the telephone call has been completed, and whereby these main points can subsequently be transmitted to and stored by a data recording apparatus, in conjunction with the entire recorded contents of the telephone call, but with a minimum of data requiring to be actually transmitted.

As a specific example of such "main points", if a business conversation is in progress, a point may be reached in that conversation at which important conditions such as the terms of a contract begin to be discussed, with that matter being the essential part of the conversation.

The overall configuration of this data recording system is as described for the first embodiment and shown in FIG. 1, with the main point recording function of this embodiment being supplemental to the telephone call recording functions of the first embodiment described hereinabove.

Figure 10:
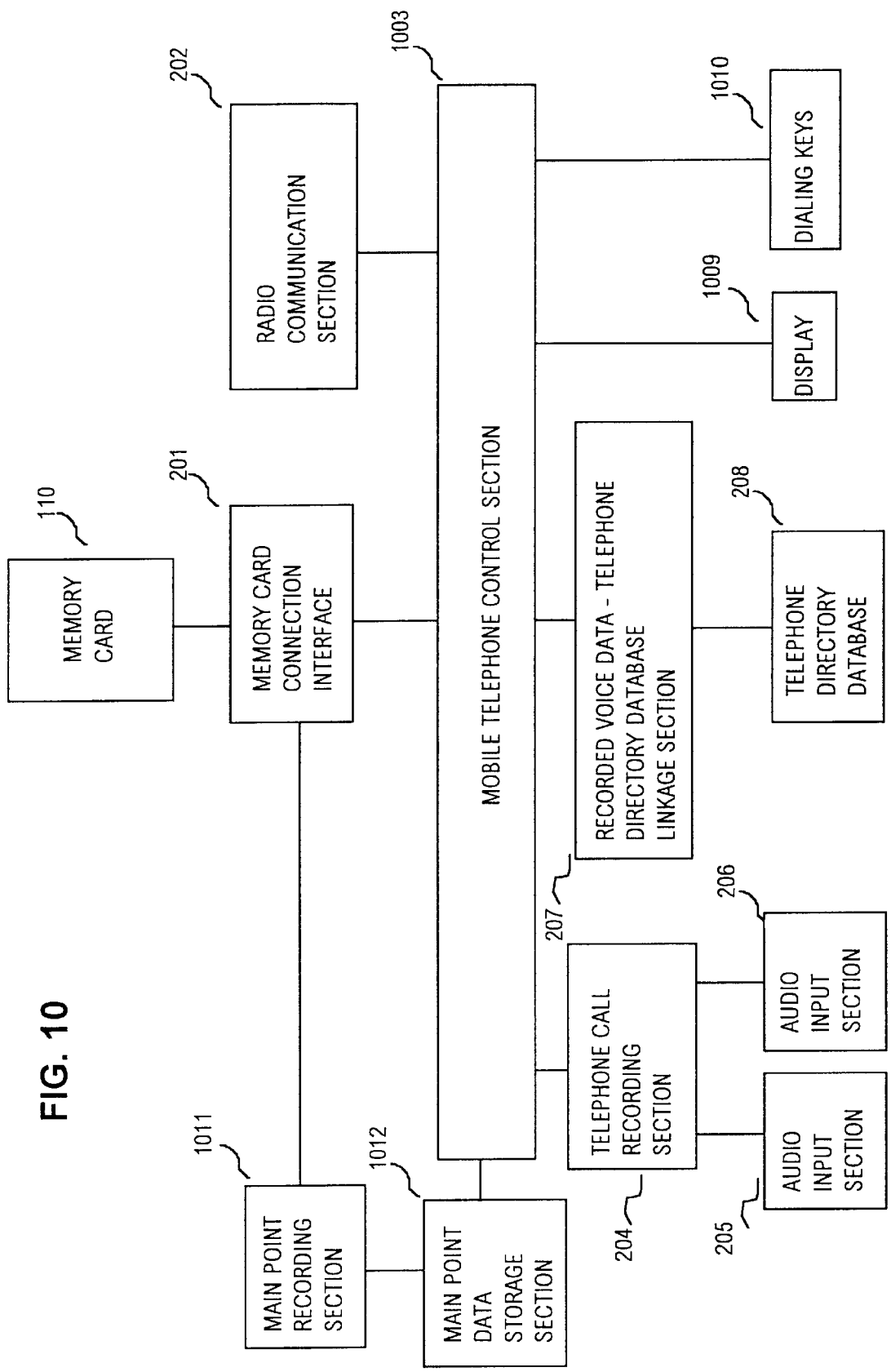
FIG. 10 is a system block diagram of a mobile telephone in a third embodiment.

As shown in FIG. 10, a mobile telephone of this embodiment includes a memory card connection interface 201, serving as an interface for mounting a memory card 110, a radio communication section 202 which serves as an interface with a base station 101, a mobile telephone control section 1003 which controls the overall operation of the mobile telephone 101, a telephone call recording section 204 for recording and storing the contents of telephone calls, an audio input section 205 having a telephone microphone, etc., an audio output section 206 having a telephone loudspeaker, etc., a recorded voice data—telephone directory database 208 which stores the names, telephone numbers, identification information, electronic mail addresses, etc., of opposite parties in telephone calls, and a recorded voice data—telephone directory database linkage section 207 for linking the contents of a telephone call recorded by the telephone call recording section 204 with predetermined information in the recorded voice data—telephone directory database 208, such as the telephone number of the opposite party in that telephone call or identification information concerning that opposite party. The mobile telephone 101 further includes a display device 1009, and dialing keys 1010 for use in inputting data such as telephone numbers. Each of the memory card 110, radio communication section 202, telephone call recording section 204, audio input section 205, audio output section 206, recorded voice data—telephone directory database linkage section 207 and recorded voice data—telephone directory database 208 can be identical in operation to the respective correspondingly numbered sections of the mobile telephone of the first embodiment, having the configuration shown in FIG. 2. The mobile telephone of the third embodiment differs by further including the main point recording section 1011 and main point data storage section 1012, and in that additional functions are performed by the mobile telephone control section 1003, display device 1009 and dialing keys 1010 of this embodiment, and also in that the format of a telephone call data record stored in the memory card 110 is modified from that of the first embodiment, as described hereinafter.

With the mobile telephone of this embodiment, the display 1009 is provided with a function for indicating that recording of a main point of telephone call is in progress. Furthermore, in addition to serving for input of telephone numbers, a predetermined actuation of the dialing keys 1010 serves to input to the mobile telephone control section 1003 a command for starting the recording of a main point, and to input a subsequent command to ending that recording. The mobile telephone further includes a main point recording section 1011 for performing recording of the main points of a telephone call, at timings in accordance with inputs supplied from the dialing keys 1010. Specifically, the main point recording section 1011 registers respective amounts of time which elapse from the start of recording a telephone call until the start and end time points of each of the recorded main points of the telephone call. The mobile telephone further includes a main point data storage section 1012 for extracting the recorded voice data of the main points, from the contents of the memory card 110, in accordance with the values of elapsed time from the start of the telephone call, (i.e., the elapsed time values which have been successively registered by the main point recording section 1011) and for storing the respective sets of main point voice data which have been extracted from the memory card 110, when recording of the telephone call contents has been completed.

In the following, only the operation whereby the main point recording section 1011 records the main points of a telephone call (while recording of the data contents of the telephone call itself is in progress, as described for the first embodiment) and whereby the data of these main points can be subsequently acquired by the telephone call recording apparatus 106, will be described referring to FIGS. 10 to 13. While a telephone call utilizing the mobile telephone 101 is being performed, if the user of the mobile telephone decides that a main point of the telephone call contents has been reached, then the user actuates the dialing keys 1010 in a predetermined manner to input a command to begin recording that main point. The mobile telephone control section 1003 detects this actuation, and notifies the main point recording section 1011 of that, while also notifying the main point recording section 1011 of the length of time which has elapsed (up to that point) from the start of recording the telephone call.

Figure 11:
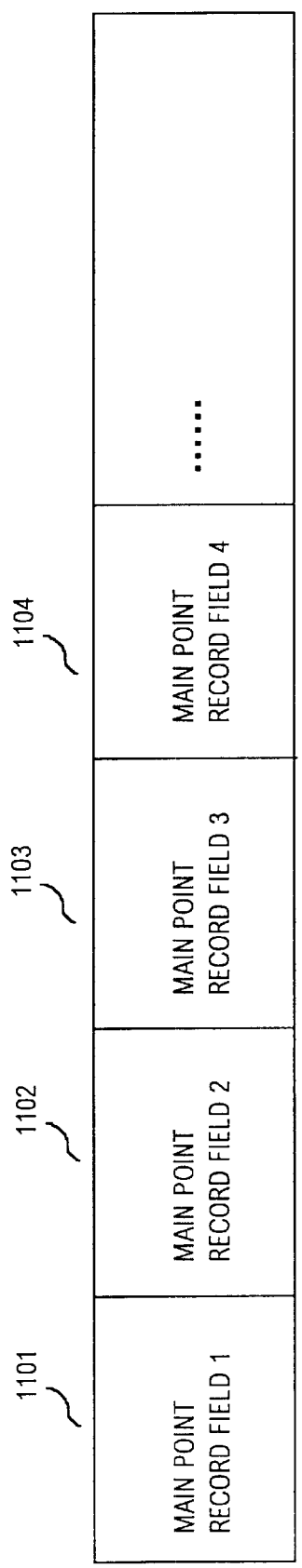
FIG. 11 illustrates a series of data fields in which elapsed time values expressing positions of main points are stored, with the third embodiment.
Figure 12:
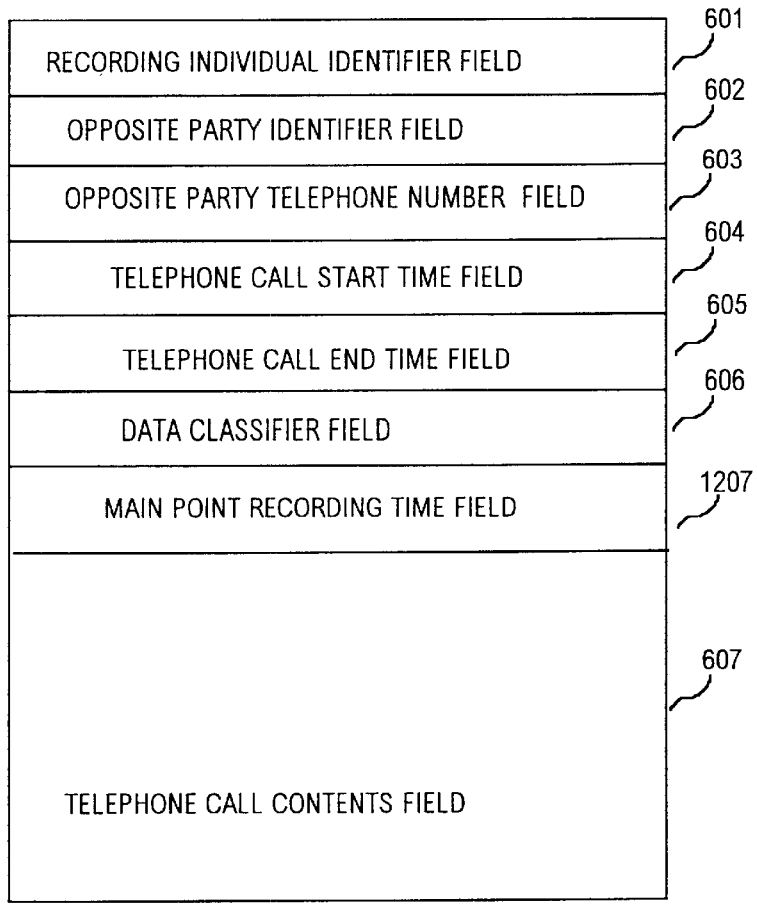
FIG. 12 shows an example of the format of a telephone call data record of the third embodiment.

The main point recording section 1011 registers respective times corresponding to the start and end points of successive main points of a telephone call by using the format shown in FIG. 11, which consists of a series of data fields, referred to in the following as main point record fields, within a main point recording field of a telephone call data record stored in the memory card 110 (as shown in FIG. 12 and described hereinafter). When the aforementioned predetermined actuation of the dialing keys is performed for the first time after the start of recording a telephone call, the main point recording section 1011 registers in the main point record field 1, designated by numeral 1101, the time that has elapsed since the start of recording the telephone call. Thus the contents of that time record 1101 indicate the start of recording the first main point. When the aforementioned actuation of the dialing keys 1010 is subsequently again performed, the main point recording section 1011 registers in a main point record field 2, designated by numeral 1102, the time that has elapsed since the start of recording the telephone call. Thus the contents of the time record 1102 indicate the end of recording the first main point. Thereafter, the main point recording section 1011 similarly records in the main point record fields 3, 4, etc., the successive amounts of time which have elapsed between the start of the telephone call and the time points at which the aforementioned predetermined actuation of the dialing keys 1010 is performed. While this is being done, the telephone call recording section 204 is not required to perform any special processing for the purpose of recording the main points, but operates as described hereinabove for the first embodiment.

As these elapsed time values are successively registered in the main point record fields of the main point recording section 1011, they are also similarly registered within in a main point recording time field in the memory card 110, or are registered therein after completion of recording the call contents, as described hereinafter.

When recording of the telephone call is ended, the main point recording section 1011 notifies the main point data storage section 1012 that respective portions of the recorded voice data of that conversation are to be transferred from the memory card 110 to the main point data storage section 1012, with these voice data portions being determined in accordance with the contents of the main point record fields shown in FIG. 11, and the main point data storage section 1012 then receives and stores these voice data portions. The user can now use the dialing keys 1010 to input commands for reading out the data of desired ones of these main points, to be listened to, modified or erased.

It can be understood that the storage capacity required for the main point data storage section 1012 can be much less than would required if the entire data contents of the telephone call were to be stored therein. It can also be understood that with the operation described above, when recording of main points is performed during recording of a telephone call, the telephone call recording section 204 operates only to continuously record and store the telephone call data contents, without being required to perform any special processing to record the main points.

Figure 13:
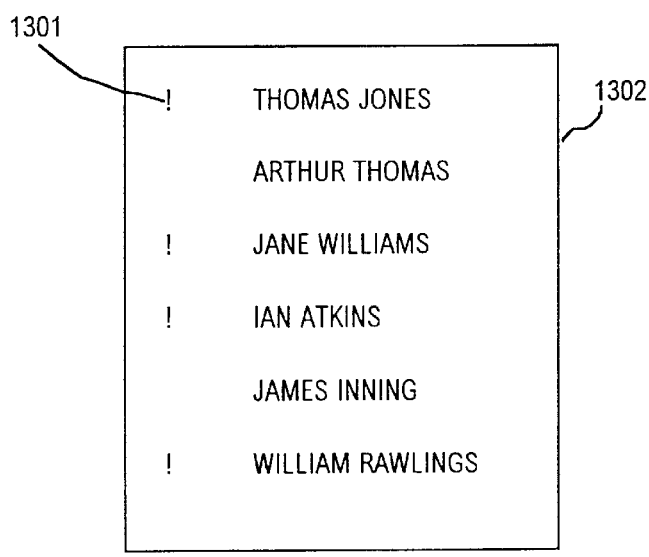
FIG. 13 shows an example of indication information that is generated on a mobile telephone display device of a mobile telephone in the third embodiment.

FIG. 13 shows an example of information which is displayed by the display device 1009 of this embodiment while recording of main points is being performed by the mobile telephone. As illustrated, the operation of recording main point data of a telephone call can be linked to identification information (e.g., name) of the opposite parties in that call. In the example of FIG. 13 the display section 1009 generates a name display 1302 in conjunction with main point recording marker symbols 1301, so that while a telephone call is in progress, the user of the mobile telephone can confirm that recording of main points is being performed, as indicated by a recording marker symbol being displayed beside the name of the opposite party in the telephone call.

When the recorded telephone call data, and the recorded main point data, are to be transmitted from the mobile telephone 101 to the telephone call recording apparatus 106, the following operations are performed. FIG. 12 shows the format in which a telephone call data record is stored in the memory card 110 with this embodiment. In FIG. 12, numeral 1207 denotes a main point recording time field, having the format shown in FIG. 11, i.e., containing a number of main point record fields into which time values are successively written, each defining a time duration that has elapsed from the start of the telephone call as described above referring to FIG. 11. The remaining fields shown in FIG. 12 are respectively identical to the correspondingly designated fields shown in FIG. 6, for the memory card 110 of the first embodiment.

Recorded telephone call data having the format described for the above example are transferred from the memory card 110 to the telephone call recording apparatus 106. The telephone call recording apparatus 106 of this embodiment includes a section (not shown in the drawings) which performs the functions of the main point data storage section 1012 shown in FIG. 10, described above, so that the contents of the main point recording time field 1207 in a received telephone call data record can be utilized to extract the data of the main points from the telephone call contents field 607 of that telephone call data record.

In that way, in addition to transferring the contents of a telephone call, if recording of main points of the telephone call has been performed, it is not necessary to transfer the actual voice data of the main points. Instead, only the respective time durations which elapse from the start of the telephone call to the start of a main point and from the start of the telephone call to the end of the main point are transmitted to the telephone call recording apparatus 106, for each of the main points in succession. As a result, the total amount of data which must be transmitted can be reduced, and in addition, a minimal amount of memory capacity of the memory card 110 is utilized for the purpose of transmitting the main point contents.

Fourth Embodiment

A fourth embodiment of a data recording system will be described, whereby when a telephone call that is being made between a mobile telephone and an internal telephone is transferred to an internal telephone, the contents of the telephone call can be recorded, with continuity of the conversation contents being maintained.

It should be understood that in the following description of this embodiment, the term "transferring a telephone call"

is used with its generally accepted meaning, i.e., that of transferring a telephone connection, rather than or transmitting the contents of a telephone call. For example, if a telephone call is being made between a telephone A and a telephone B, and a connection is then made between the telephone B and a telephone C (e.g., with the connection between the telephone A and telephone B held in a waiting condition until the connection has been established between the telephone B and a telephone C) then this will be referred to as "transferring that telephone call from telephone A to telephone C".

Figure 14:
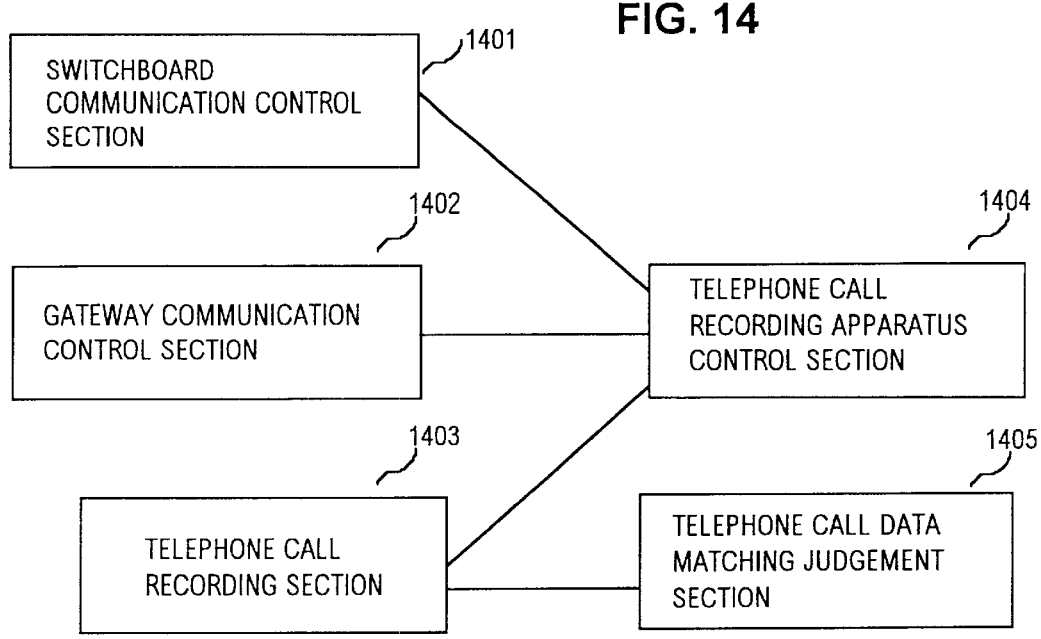
FIGS. 14 and 15 respectively show a telephone call recording apparatus and an example of a telephone call data record format, for a fourth embodiment.

The overall configuration of the mobile telephone 101 of this embodiment is similar to that of FIG. 1, but with the mobile telephone control section 203 of the fourth embodiment having a function for attaching call transfer indication information to a stored telephone call data record, as described in the following A telephone call recording apparatus 106 of this system, as shown in FIG. 14, consists of a switchboard communication control section 1401 which performs control of communication performed via the switchboard 104, a gateway communication control section 1402 which performs communication control of the gateway 107, a telephone call recording section 1403 for applying telephone call data recording to the internal telephone 105 and for storing the resultant data, a telephone call recording apparatus control section 1404 which performs overall control of the telephone call recording apparatus 106, and a telephone call data matching judgement section 1405 which functions, when recorded telephone call data are received from a memory card 110, to judge whether these data and recorded telephone call data which are held in the telephone call recording apparatus 106 are data of the same telephone call, with transfer of that telephone call having occurred.

Figure 15:
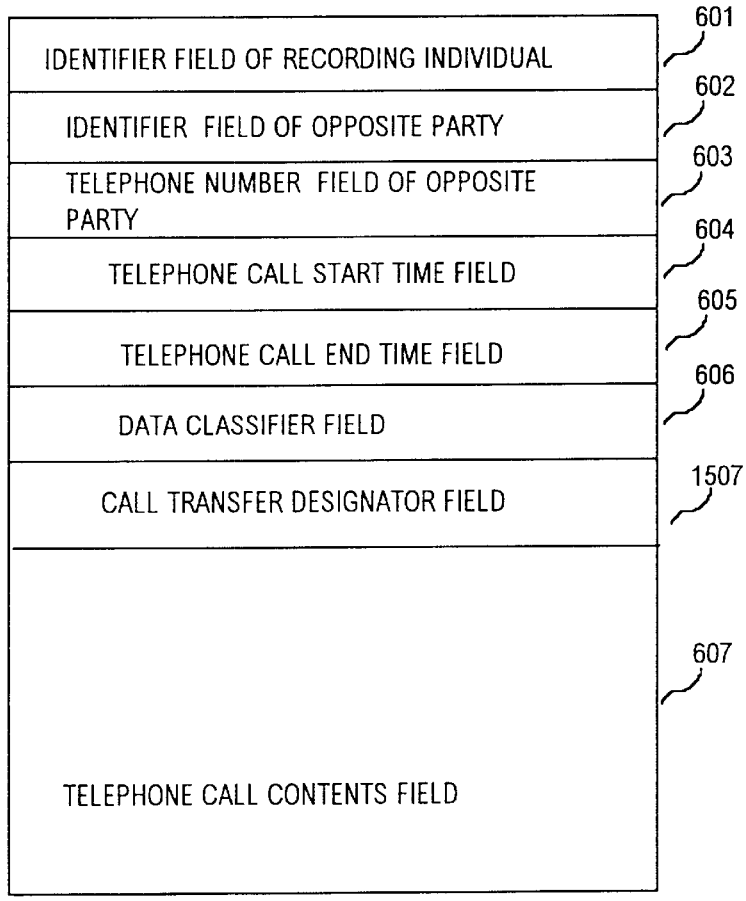

FIG. 15 shows an example of the data recording format used for storing the data of a telephone call in the memory card 110 and in the telephone call recording apparatus 106, with this embodiment. In FIG. 15, numeral 1507 designates a call transfer designation field, into which predetermined data (referred to in the following as a call transfer designator) can be inserted for indicating that the recorded telephone call contents are those of a call which has been transferred. The contents of the other fields are as described for the first embodiment, as shown in FIG. 6.

The operation of this data recording system embodiment will be described for the case in which a telephone call that is being made between a mobile telephone 101 and an external telephone 111 is transferred by the mobile telephone 101 to an internal telephone 105. It will be assumed that after the telephone call is started between the mobile telephone 101 and external telephone 111, recording of the contents of the telephone call is started. These contents are thereby saved as a telephone call data record, as described above for the first embodiment. If that telephone call from the mobile telephone 101 is then to be transferred to a internal telephone 105 (i.e., the telephone communication connection is to become between the external telephone 111 and internal telephone 105) then the mobile telephone control section inserts the aforementioned call transfer designator information into the call transfer designator field 1507. The mobile telephone 101 then sets the connection to the external telephone 111 in a waiting condition, until transfer of the telephone call to the aforementioned internal telephone 105 has been completed.

When the switchboard 104 receives the transferred telephone call from the external telephone 111 via the public telephone network 103, it notifies the telephone call recording apparatus 106 that a call is being transferred to an internal telephone 105. The telephone call recording apparatus 106 then begins recording of the telephone call between the external telephone 111 and that internal telephone 105. At this time, the telephone call recording apparatus control section 1404 receives notification of the call transfer from the switchboard communication control section 1401, and issues an instruction to the telephone call recording section 1403 to start recording of the telephone call, while at the same time notifying the telephone call recording section 1403 that the call which is being recorded is a transferred telephone call. When the telephone call recording section 1403 receives this instruction to begin recording of a transferred telephone call, it begins to generate a telephone call data record having the format shown in FIG. 15, with a call transfer designator inserted into the call transfer designator field 1507, then executes processing to record the telephone call data contents in the field 607 of that telephone call data record.

After recording of the transferred portion of the telephone call by the telephone call recording apparatus 106 has ended, when the memory card 110 is then removed from the mobile telephone 101 and inserted into a computer 109, the telephone call data record stored in the memory card 110 is transmitted via the gateway 107 to the telephone call recording apparatus 106. The telephone call recording apparatus control section 1404 then first examines the call transfer designator field 1507 and thereby determines that the received data are those of the initial portion of a telephone call, which ended by being transferred. The telephone call recording apparatus control section 1404 then sends to the telephone call data matching judgement section 1405 an instruction to analyze the telephone call data records which are held in the telephone call recording section 1403. The telephone call data matching judgement section 1405 thereby detects that there is a telephone call data record in which the call transfer designator field 1507 contains the call transfer designator, and thereby assumes that this data record contains the final portion of a telephone call, i.e., which started by being transferred.

When it is such a transferred telephone call data record is found, the telephone call data matching judgement section 1405 then compares the contents of the opposite party identifier field 602 of that data record, held in the telephone call recording section 1403, with the contents of the opposite party identifier field 602 of the telephone call data record which has been received from the mobile telephone 101, to detects whether the contents of these two fields 602 are identical. If this matching is found to occur, then the telephone call data matching judgement section 1405 performs analysis to determine whether the contents of the telephone call end time field 605 of the telephone call data record received from the memory card 110 matches the contents of the telephone call start time field 604 in the corresponding telephone call data record held in the telephone call recording section 1403. If the contents of these fields are found to match (i.e., recording of the data record held in the telephone call recording section 1403 started at the time when recording of the data record sent from the mobile telephone 101 ended) then this indicates that the recorded telephone call data held in the telephone call recording section 1403 are data of those of a final portion of a transferred telephone call, with the data of the first portion of that telephone call having been stored in the memory card 110. In that case, the telephone call data matching judgement section 1405 instructs the telephone call recording section 1403 to combine these two sets of data, i.e., to link the start of the recorded voice data held in the telephone call contents field 607 of the telephone call data record held in the telephone call recording section 1403 with the end of the recorded voice data held in the telephone call contents field 607 of the telephone call data record received from the mobile telephone 101. In response, the telephone call recording section 1403 combines the two sets of recorded voice data in that manner, and stores the resultant data as the contents of a single telephone call.

As a result, even if a call made between a mobile telephone 101 and an external telephone 111 is transferred to an internal telephone 105, continuous recording of the entire call, and storage of the resultant telephone call data, can be achieved in a very simple manner, without requiring any changes to be made in the public telephone network 103.

The above has been described for the case in which a call made between a mobile telephone 101 and an external telephone 111 is transferred by the mobile telephone 101 to an internal telephone 105. However it can readily be arranged that similar operation occurs for the case in which a telephone call made from an internal telephone 105 to an external telephone 111 is transferred by the internal telephone 105 to a mobile telephone 101.

As can be understood from the above description of embodiments, the present invention provides increased convenience to users of mobile telephones who also utilize internal telephones, e.g., at a place of business, with the contents of telephone calls performed using the internal telephones being recorded and stored as data by a telephone conversation recording apparatus, since the invention enables the contents of telephone calls performed by such a user while at a remote location, using a mobile telephone, to be acquired and stored by the telephone conversation recording apparatus in the same format as is utilized for internal telephones. Hence the user (e.g., after returning to his or her place of business) can access and utilize the stored contents of a telephone call which was performed using a mobile telephone in exactly the same way as for telephone call which was performed using an internal telephone.

Although the present invention has been described in the above with respect to specific embodiments, it should be understood that various modifications to these embodiments could be envisaged which fall within the scope claimed for the invention, as set out in the appended claims.

What is claimed is:

1. A mobile telephone for use in a data recording system having a telephone switchboard for performing switching of telephone call connections of an internal telephone, and a telephone call recording apparatus for recording communication data or voice data contents of telephone calls which are communicated through said telephone switchboard, the mobile telephone comprising:

memory card connection means serving as an interface for connecting a memory card, radio communication means for performing communication via a base station, data recording means for recording, in a telephone call data record stored on a memory card, communication data contents or voice data contents of a telephone call which is communicated via said radio communication means, audio input means for inputting a voice signal, audio output means for rendering a voice signal audible, telephone directory database means having stored therein, for each of a plurality of potential telephone call opposite parties, a set of related data concerning said opposite party, said set of related data including at least a telephone number and an identifier of said opposite party, database data linkage means for relating an opposite party of a telephone call which is being performed using said mobile telephone to a corresponding one of said sets of related data held in said telephone directory database means, a set of dialing keys operable for inputting telephone numbers, and for inputting commands to designate starting and ending of recording of each of respective main points within said communication data or voice data contents of a telephone call performed using said mobile telephone, main point recording means responsive to said commands designating starting and ending of recording of said main points for recording, for each of said main points, respective amounts of time which elapse from a time point of starting recording of said communication data or voice data contents until the start of recording said main point and until the end of recording said main point, and main point data storage means functioning in accordance with said values of elapsed time which are recorded by said main point recording means for reading out and storing portions of said communication data or voice data stored in said memory card which constitute the recorded data of said main points, following completion of recording said communication data or voice data contents of said telephone call.

2. The mobile telephone according to claim 1, wherein said values of elapsed time corresponding to said main points are transferred via said memory card connection means to be successively stored in said memory card together with said communication data or voice data contents of said telephone call.

3. The mobile telephone according to claim 1, comprising display means and means for controlling said display means, when said main points of a telephone call are being recorded, to display information which is indicative of the occurrence of said main point recording.

4. A data recording system having at least one internal telephone, a switchboard connected to said internal telephone for performing switching of telephone call connections of said internal telephone, and a telephone call recording apparatus for recording communication data or voice data contents of telephone calls which are performed using said internal telephone, and comprising:

at least one memory card, and at least one mobile telephone having interface means for connecting to said memory card, a computer network for relaying data between computers, a gateway for relaying data from said telephone call recording apparatus to said computer network and for relaying data from said computer network to said telephone call recording apparatus, and at least one computer connected to said computer network for data communication and having interface means for connecting to said memory card, wherein said mobile telephone comprises database means having stored therein respective sets of information relating to a plurality of potential telephone call opposite parties in conjunction with telephone numbers of said potential opposite parties, and means for storing in said memory card a telephone call data record containing the communication data contents or voice data contents of a telephone call performed using said mobile telephone and for reading out a part of said internally stored information which relates to an opposite party of said telephone call and including said information in said stored telephone call data record, and wherein said telephone call data record is subsequently read out from said memory card and transmitted to said telephone call recording apparatus to be stored therein.

5. The data recording system according to claim 4, wherein when a telephone call is transferred from said mobile telephone to said internal telephone, or from said internal telephone to said mobile telephone, data constituting a call transfer designator is attached to a telephone call data record containing communication data or voice data contents of a part of said transferred call which was performed using said mobile telephone and which is stored in said memory card, and an identical call transfer designator is attached to a telephone call record containing communication data or voice data contents of a part of said transferred call which was performed using said internal telephone, which is stored in said telephone call recording apparatus, and wherein when said telephone call data record is transmitted from said memory card to said telephone call recording apparatus, said telephone call recording apparatus combines the respective communication data or voice data contents of each of said telephone call data records into a single set of communication data or voice data.

6. The data recording system according to claim 5, wherein said telephone call recording apparatus comprises switchboard communication control means for controlling communication via said telephone switchboard, gateway communication control means for controlling communication with said gateway, data recording means for recording and storing communication data or voice data of a telephone call performed using said internal telephone, as a telephone call data record which includes said apposite party identifier, and for storing said telephone call data record which is transmitted from said memory card, telephone call recording apparatus overall control means for performing overall control of operation of said telephone call recording apparatus, and functioning, when a notification is received from said telephone switchboard that a telephone call received by said internal telephone is a transferred call, to control said data recording means to attach said call transfer designator to said telephone call data record of said telephone call that is recorded and stored by said data recording means, and recorded data judgement means functioning when a telephone call data record is transmitted from said memory card for:
analyzing said telephone call data record to detect the presence of said call transfer designator attached to said record, when said call transfer designator is detected therein;
determining whether there is a telephone call data record that has been recorded by said data recording means which has said call transfer designator attached thereto; and
when such a telephone call data record recorded by said data recording means is found, judging whether said telephone call data record and said telephone call data record transmitted from said memory card contain data of the same telephone call.

7. The data recording system according to claim 6, wherein when a telephone call performed using said mobile telephone is set in a waiting condition and said telephone call is transferred to said internal telephone, said call transfer designator is attached to said telephone call data record stored in said memory card by said mobile telephone, when said data recording means receives notification sent from said telephone switchboard that said telephone call is transferred to said internal telephone, and begins to record the communication data or voice data of said telephone call in a telephone call data record with said call transfer designator attached, and following termination of recording said communication data or voice data of said telephone call by said data recording apparatus, when said telephone call data record stored in said memory card has been transmitted to said telephone call recording apparatus, said recorded data judgement means compares said transmitted telephone call data record with each of respective telephone call data records stored in said data recording means, and when a telephone call data record stored in said data recording means is found to have said call transfer designator attached thereto and to contain an opposite party identifier that is identical to an opposite party identifier in said telephone call data record transmitted from said memory card, combines said communication data or voice data contents of said telephone call data record that has been stored in said data recording means with said communication data or voice data contents of said telephone call data record which has been transmitted from said memory card.

8. The data recording system according to claim 4, wherein said mobile telephone further comprises means for attaching, to said telephone call data record stored on said memory card, data constituting a user identifier relating to a user of said mobile telephone, wherein when said memory card is connected to said computer said user identifier is transmitted to said telephone call recording apparatus via said computer network and said gateway, and wherein said telephone call recording apparatus comprises means responsive to reception of said user identifier for transmitting to said computer, via said gateway and said computer network, a telephone call data record corresponding to said user, to be stored on said memory card.

9. The data recording system according to claim 8, wherein said mobile telephone comprises means for recording, within a telephone call data record, recording start time data indicative of a time at which recording of said communication data contents or voice data contents of a telephone call corresponding to said telephone call data record was started, and wherein said recording start time data and said opposite party identifier are transmitted to said telephone call recording apparatus from said memory card when said memory card is connected to said computer, and wherein when said opposite party identifier is identical to an opposite party identifier of said telephone call data record that is stored at said telephone call recording apparatus and said telephone call data record that is stored at said telephone call recording apparatus has been recorded subsequent to said telephone call data record currently stored in said memory card, said telephone call data record that is stored at said telephone call recording apparatus is transmitted to be stored in said memory card, while otherwise, said telephone call data record is not transmitted to be stored in said memory card.

10. The data recording system according to claim 9, wherein said telephone call recording apparatus comprises switchboard communication control means for controlling communication with said telephone switchboard, gateway communication control means for controlling communication with said gateway, data recording means for storing communication data or voice data of a telephone call performed using said internal telephone, as a telephone call data record which includes said recording start time data and said opposite party identifier, and for storing said telephone call data record which is transmitted from said memory card, telephone call recording apparatus control means for performing overall control of operation of said telephone call recording apparatus, and telephone call data judgement means for comparing respective opposite party identifiers of said telephone call data record stored in said telephone call recording apparatus and said telephone call data record transmitted from said memory card, and for judging a time precedence relationship between respective recording starting times indicated by said recording start time data of said telephone call data record stored in said telephone call recording apparatus and said telephone call data record transmitted from said memory card.

11. The data recording system according to claim 4, comprising a public telephone network which is connected to said telephone switchboard and a mobile telephone base station which is connected to said public telephone network and is in radio communication with said mobile telephone, wherein, following completion of a telephone call performed by said mobile telephone, said telephone call data record is read out from said memory card by said mobile telephone and is transmitted via said mobile telephone base station, said public telephone network, and said telephone switchboard to said telephone call recording apparatus, to be stored therein.

12. The data recording system according to claim 4, wherein said mobile telephone comprises means operable to selectively record main point time data in said telephone call data record, with said main point time data indicating for each of one more main points constituted by specific portions of said communication data contents or voice data contents a start time point and an end time point of said main point, with each said start time point and end time point expressed as an amount of elapsed time with respect to a starting time point of recording said communication data contents or voice data contents.

13. The data recording system according to claim 12, wherein said mobile telephone comprises:

main point recording means responsive to a predetermined actuation of dialing keys for recording an amount of time which has elapsed from the start of recording said communication data contents or voice data contents of a telephone call, as a time amount indicative of a starting point of recording a main point or an end point of recording a main point, and main point data storage means for extracting said main points from communication data contents or voice data contents of said telephone call data record stored in said memory card, in accordance with said amounts of elapsed time which are recorded by said main point recording means, following completion of recording said communication data contents or voice data contents.

14. The data recording system according to claim 13, wherein said mobile telephone further comprises display means and means for controlling said display means, when said main points of a telephone call are being recorded, to display information which is indicative of the occurrence of said main point recording.

15. The data recording system according to claim 4, wherein said telephone call recording apparatus stores telephone call data records transmitted from respective ones of a plurality of said memory cards in a data directory configuration which is determined in accordance with the identities of users of mobile telephones corresponding to said memory cards and in accordance with said information relating to opposite parties which is attached to said telephone call data records.

16. The data recording system according to claim 4, wherein following completion of a telephone call performed by said mobile telephone, said memory card is disconnected from said mobile telephone and is connected to said computer, and wherein said telephone call data record is read out from said memory card by said computer and transmitted via said computer network and said gateway to said telephone call recording apparatus, to be stored therein.

17. A data recording system according to claim 4, comprising:

database linkage means controllable for relating one of said sets of information stored in said database means to an opposite party of a telephone call which is being performed by said mobile telephone, for reading out said set of information.

\* \* \* \* \*

UNITED STATES PATENT AND TRADEMARK OFFICE
CERTIFICATE OF CORRECTION

PATENT NO. : 6,690,950 B2
DATED : February 10, 2004
INVENTOR(S) : Kenji Takagi et al.

It is certified that error appears in the above-identified patent and that said Letters Patent is hereby corrected as shown below:

<u>Title page,</u>
Item [30], should read as follows:
-- [30]  Foreign Application Priority Data
Jul. 31, 2000   (JP)            2000-231546
Jun. 19, 2001   (JP)            2001-185208 --

Signed and Sealed this

First Day of June, 2004

JON W. DUDAS
*Acting Director of the United States Patent and Trademark Office*